:::
United States Patent [19]

Carré et al.

[11] 4,445,263
[45] May 1, 1984

[54] METHOD OF PREFORMING A BOOSTER CASING ELEMENT WITH ITS REINFORCEMENT

[75] Inventors: Jean-Jacques Carré, Le Raincy; Roland Levrai, Stains, both of France

[73] Assignee: Societe Anonyme DBA, Paris, France

[21] Appl. No.: 344,277

[22] Filed: Feb. 1, 1982

[30] Foreign Application Priority Data

Feb. 19, 1981 [FR] France .................... 81 03271

[51] Int. Cl.³ .............................. B21D 3/10
[52] U.S. Cl. ...................... 29/445; 72/379; 72/391
[58] Field of Search ......... 72/316, 348, 391, 379, 72/414; 29/159 R, 159.01, 159.3, 445, 406; 228/155

[56] References Cited

U.S. PATENT DOCUMENTS 2,244,927 6/1941 Vanstone et al. .............. 72/316

Primary Examiner—Lowell A. Larson
Attorney, Agent, or Firm—Leo H. McCormick, Jr.; Ken C. Decker

[57] ABSTRACT

A method of forming a casing for a booster wherein the casing is preliminarily preformed with a peripheral sleeve portion and a flat base portion connected by a web. The preformed casing is placed in a frame and the peripheral sleeve portion held in substantially fixed position to maintain a required transverse dimension. A reinforcing member is positioned adjacent the flat base and an axial force applied to the reinforcing member to prestress the web to a final desired shape.

6 Claims, 3 Drawing Figures

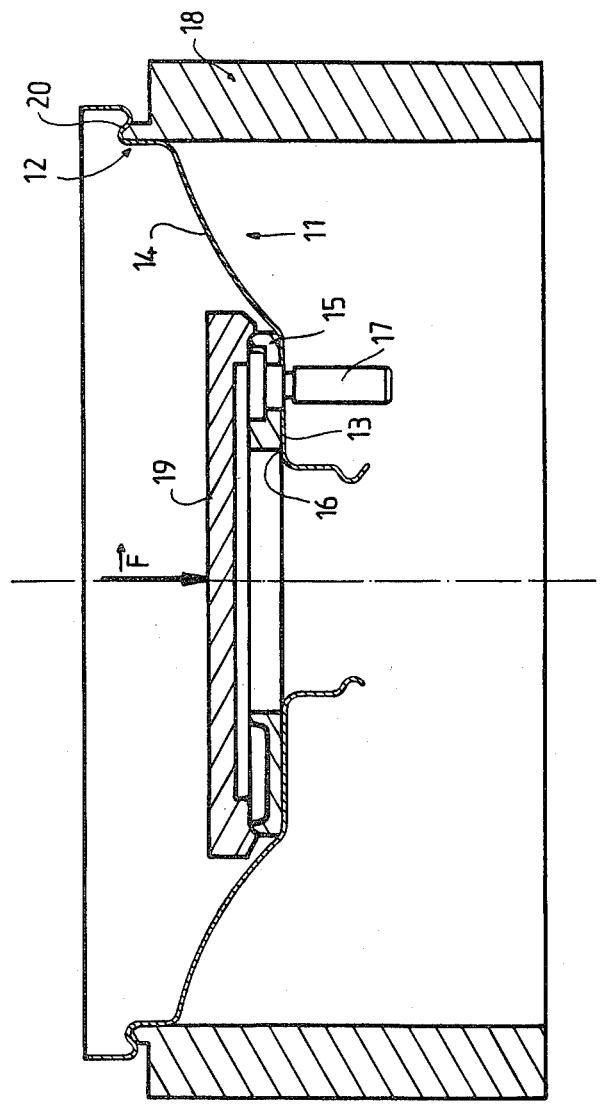
FIG_1

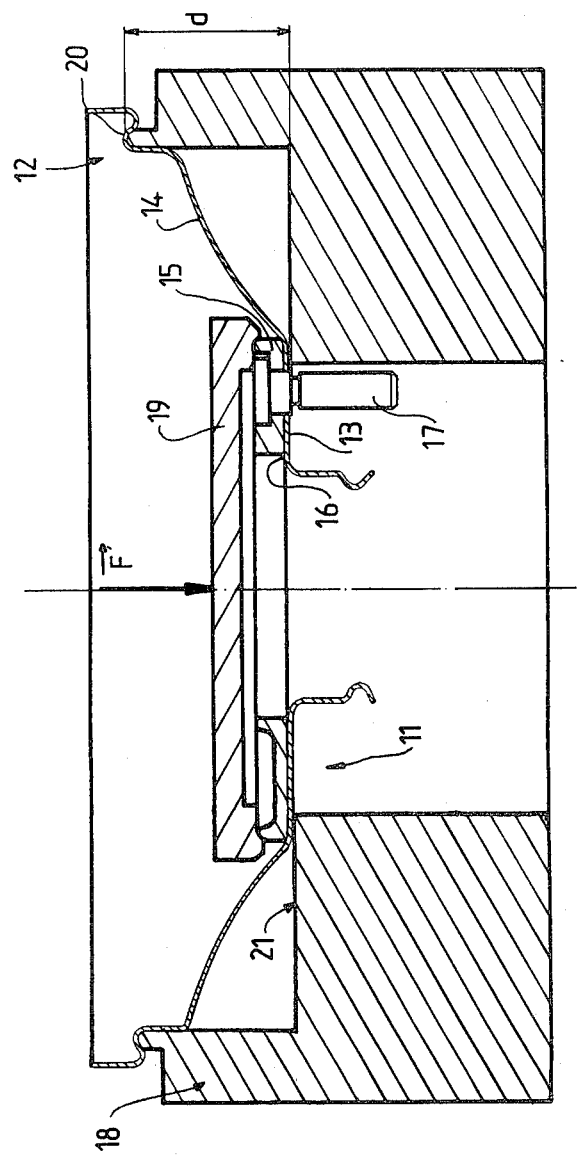
FIG_2

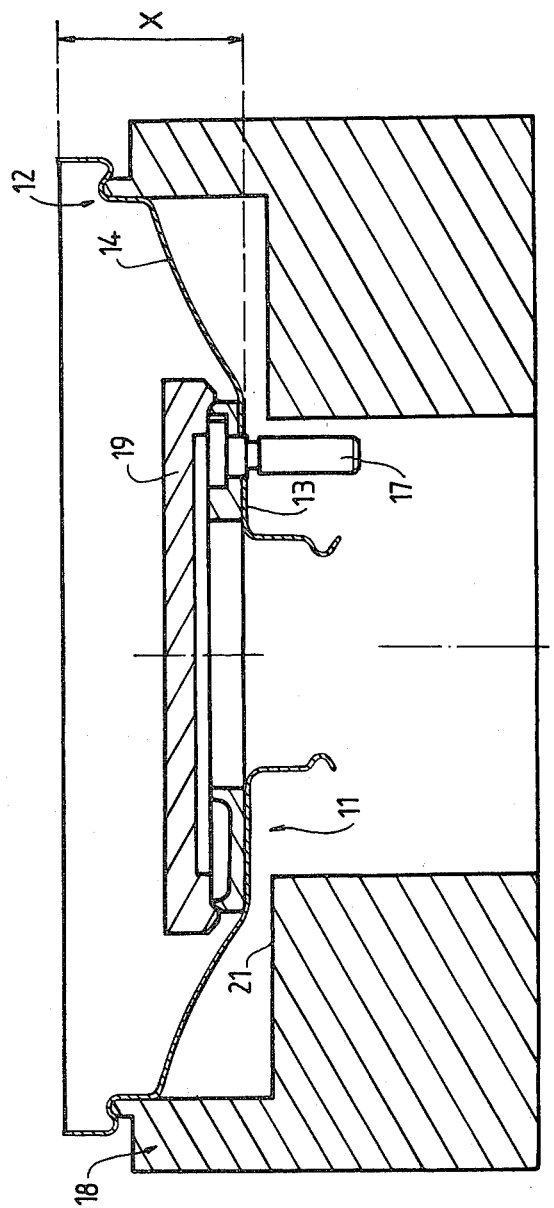
FIG_3

METHOD OF PREFORMING A BOOSTER CASING ELEMENT WITH ITS REINFORCEMENT

The invention concerns a method of preforming a braking assistance booster casing element, especially a booster of the vacuum type and relates more particularly to the mounting of an inner reinforcement in this casing element, intended to bear and to distribute the wrenching forces exerted on the fixing screws.

A booster to which the invention applies is generally formed of two casing elements or shells housing a drive piston dividing the interior of the casing into two chambers, one of the chambers being intended to be connected to a vacuum source available on the vehicle (the vacuum in the inlet manifold of the engine, for example) while the other chamber can be put in communication with the first chamber or with the atmosphere alternately. A mechanism forming a three-way valve, actuated by a control rod connected to the brake pedal allows this switching. Putting the second chamber in communication with the atmosphere causes a displacement of the drive piston, to actuate a braking master cylinder. The master cylinder is conventionally mounted on one of the axial ends of the booster casing and the unit is fixed to a fixed wall of the vehicle, by the other axial end of the booster. Consequently, when a braking effort is transmitted axially by the control rod, the reaction is transmitted to the fixed wall of the vehicle via the booster casing unit. The standards currently in force preclude any permanent deformation of the casing as from the first application of the brakes.

It is also known to mount fixing screws on the master cylinder as well as on the fixed mounting wall, with interposition of a reinforcement inside each casing element, the screw-heads resting on this reinforcement and the threaded parts projecting outwards for mounting the respective master cylinder or booster. It is clear that the afore-mentioned reaction forces actually pass through these screws; the reinforcements therefore allow deformation of the casing and stripping of the screws to be avoided, by distributing these forces over a wide area of each axial face of the casing. The reinforcements prove particularly advantageous in the most recent boosters with lighter structures, particularly those using casing elements made of aluminium or plastics material.

The invention particularly concerns an improvement in the mounting of such a reinforcement, with the aim of eliminating any subsequent permanent elongation of the casing (particularly in putting the booster in service) which can be attributed to bad positioning of the reinforcement with respect to the wall of the casing with which it cooperates.

With this object, the invention concerns a method of preforming a braking assistance booster casing element, comprising an assembly sleeve and a flat fixing base connected by a web as well as at least one reinforcement applied to the inner face of said base, characterized by an operation consisting in applying to said reinforcement when in position a force directed perpendicularly to said inner face and towards the exterior of said casing element, so as to ensure good cooperation between the parts of said reinforcement and said base which are in contact.

The method defined hereinbefore is particularly advantageous when the casing element concerned includes a web with an optimized profile (particularly with a substantially parabolic profile) since, in this instance, the characterized operation referred to hereinbefore can be used to give said web its shape and definitive dimensions after this has been preformed by stamping.

The invention will be better understood and its other advantages will be more clearly shown in the light of the following description, given solely by way of example and with reference to the attached drawings in which:

FIG. 1 illustrates diagrammatically implementation of a method in conformance with the principle of the invention;

FIGS. 2 and 3 illustrate implementation of a variant of this method.

FIG. 1 showns in section a booster casing element 11, in position for the implementation of the method which will be described hereinafter. This casing element comprises an assembly sleeve 12 to be fitted later to another similar casing element, a flat fixing base 13 and a web 14 connecting the sleeve 12 to the flat base 13. In the example described, the final profile of the web 14 is substantially parabolic. The advantages of such a web have been indicated in French patent application No. 79-15413 corresponding to U.S. patent application Ser. No. 441,716 filed Nov. 15, 1982 filed in the name of the applicant. In addition, an annular reinforcement 15 is applied to the inner face 16 of the base 13 to avoid deformation of the latter in the vicinity of fixing screws 17 (to the point of screws stripping) under the effect of reaction forces produced during braking, as explained hereinbefore.

In conformance with the invention, the sleeve 12 is set to bear on a peripheral support 18 and a force of predetermined value, directed perpendicularly to said inner face 16 and towards the exterior of the casing element 11, is applied to the reinforcement 15 in position on the inner face 16. It is clear that what is defined as the exterior of the casing element is in fact the exterior of the casing itself when it is formed by assembling two similar elements 11. Application of the force is therefore effected in the direction of the arrow F of FIG. 1 and via a disc-shaped driver 19 hollowed out over the central part of one of its faces so as to cooperate essentially with the periphery of the reinforcement 15.

Application of the afore-mentioned force has the effect of ensuring good cooperation between the parts of the reinforcement 15 and the base 13 in contact. It can lead to a permanent deformation of the casing element, in the axial direction, of some tenths of a millimeter but this deformation occurring at this stage of the production of the casing allows perfectly elastic deflection of the casing on braking to be subsequently guaranteed, which corresponds to the standards currently in force. It should also be noted that the sleeve 12 of the casing element is set to bear on the peripheral support 18 via a folded-back edge 20 of this which can be used for subsequent assembling of two complementary casing elements. Implementation of the method is therefore particularly simple since a pre-existing structural detail of the casing is used to advantage to position it during implementation of the method described hereinbefore.

In the method described with reference to FIGS. 2 and 3, the analogous structural elements bear the same reference numbers as in FIG. 1. The peripheral support 18 is, however, completed by an abutment 21 in a predetermined position (i.e. the abutment surface 21 is at a predetermined distance "d" from the bearing region defined by the support 18) on which the base 13 is capable of being applied under the action of a force F' exerted on the reinforcement 15 in the same conditions as before, i.e. via the driver 19. The value of the force F' is less critical than in the method described in FIG. 1; however, it must be sufficient to bring the base 13 into effective contact with the abutment 21. This variant is advantageous in that the casing element 11 can be roughly preformed by stamping, short of its final required shape, before implementation of the method described, which allows said web to be given its shape and definitive dimensions by an operation consisting in bringing the base 13 into contact with the abutment 21. In such conditions, it has been established, the final axial extent of the casing element 11, after removal of the force F' (distance "x", FIG. 3) is substantially better controlled in production.

The invention is of course not limited to the two variants in method just described. In particular, omission of the driver 19 and application of the force F' via the fixing screws 17, i.e. either by pushing exclusively on the screw-heads or by exerting traction on the threaded parts of these, is quited conceivable. In the last instance, better cooperation between the screw-heads and the reinforcement 15 is even ensured. This means that the invention covers all the technical equivalents of the means used, if these come within the scope of the following claims.

We claim:

1. A method of forming a casing element of a braking assistance booster, said casing element having a peripheral assembly sleeve portion, a flat annular central fixing base portion with an inner face axially spaced from said sleeve portion and an intermediate web portion integral with said sleeve portion and said base portion and interconnecting same, at least one annular reinforcement member being positioned adjacent the inner face of the base portion, the method comprising the following steps:

preforming the casing element to the required transverse dimensions;

positioning said casing element on a stationary annular frame, said casing element being supported on said frame by its said peripheral sleeve portion;

installing the annular reinforcement member on said inner face of said base portion; and applying on said reinforcement member installed on said base portion a uniform controlled force in the direction perpendicular to said base portion and opposite said sleeve portion to stress said intermediate web portion to the desired final shape.

2. The method of claim 1, which further includes the step of:

applying said force onto said reinforcement member until said base portion comes into abutment against a stationary adjustable stop to limit the displacement of said base portion to said desired final shape for said intermediate web portion.

3. The method of claim 2, which further includes the step of:

installing a driver on the side of said reinforcement member opposite to said inner face of said base portion, said force being applied to said driver.

4. The method of claim 3, wherein said driver is shaped so as to bear on the peripheral portion of said opposite side of said reinforcement member.

5. The method of claim 2, which includes the preliminary step of:

mounting on said reinforcement member fixing screws intended for securing ulteriorly the casing element to an associated structure, said force being applied to said reinforcement member through said fixing screws.

6. The method of claim 5, wherein said casing element is preformed so as said peripheral sleeve portion is connected to said intermediate web portion by a folded-back zone, said casing element being supported on said stationary frame by said folded-back zone.

* * * * *